(12) United States Patent
Kikuchi

(10) Patent No.: US 6,563,038 B2
(45) Date of Patent: May 13, 2003

(54) KARAOKE SYSTEM

(75) Inventor: Tatsuya Kikuchi, Tokyo (JP)

(73) Assignee: Takara Co., LTD, Tokyo (JP)

( * ) Notice: Subject to any disclaimer, the term of this patent is extended or adjusted under 35 U.S.C. 154(b) by 0 days.

(21) Appl. No.: 10/017,781

(22) Filed: Oct. 30, 2001

(65) Prior Publication Data

US 2002/0184994 A1 Dec. 12, 2002

(30) Foreign Application Priority Data

Jun. 12, 2001 (JP) .......................................... 2001-177536

(51) Int. Cl.$^7$ .............................. G09B 5/00; G09B 15/04
(52) U.S. Cl. ................... 84/610; 84/477 R; 84/DIG. 6; 434/307 A
(58) Field of Search ................... 84/609–614, 634–638, 84/477 R, 478, DIG. 6; 434/307 A

(56) References Cited

U.S. PATENT DOCUMENTS

| | | | | |
|---|---|---|---|---|
| 5,533,903 A | * | 7/1996 | Kennedy | 84/610 X |
| 5,827,990 A | * | 10/1998 | Fujita | 84/610 |
| 6,248,944 B1 | * | 6/2001 | Ito | 84/477 R |
| 6,267,600 B1 | * | 7/2001 | Song | 84/610 X |
| 6,278,048 B1 | * | 8/2001 | Lee | 84/610 |

* cited by examiner

Primary Examiner—Stanley J. Witkowski

(57) ABSTRACT

A karaoke system which can be conveniently used by children and youths and help to enhance their creative power and thinking power. The karaoke system includes a main unit connectable to a display unit through a wire or by wireless. The main unit feeds the display unit with image data for displaying words of a music piece on the display unit and music data for playing accompaniment music of the music piece, thereby a karaoke performance being carried out according to the words displayed on the display unit and the accompaniment music outputted from the display unit. In the karaoke system thus constructed, the main unit is constructed so as to permit the display unit to display images constituting at least one story in order and so as to output words and accompaniment music of a music piece associated with the story to the display unit during the course of the story.

12 Claims, 6 Drawing Sheets

KARAOKE SYSTEM

BACKGROUND OF THE INVENTION

This invention relates to a karaoke system, and more particularly to a karaoke system wherein music for a karaoke performance is incorporated in a story.

The term "karaoke" is generally defined to be "a form of entertainment, offered typically at bars or clubs, in which people take turns to sing popular songs into a microphone over pre-recorded backing tracks" (The New Oxford Dictionary of English published by Oxford University Press in 1998).

Recently, karaoke has constituted one of most popular amusements without distinction of age and sex and gained a firm position in the industrial world. Thus, karaoke equipment manufacturers have a fierce competition with others in order to permit their own karaoke system to be advantageously differentiated from those of other manufacturers. For this purpose, each of the manufacturers devotes itself to addition of any significant value to its own karaoke system. For example, it is proposed that a karaoke system is provided with a marking function. More particularly, a karaoke system is proposed which is constructed so as to make a variety of developments depending on results of marking obtained by the marking function.

However, such a marking function becomes old-fashioned nowadays, thus, the marking function fails to make a differentiation between karaoke systems. Also, the conventional karaoke systems were mainly developed for adults including students, resulting in them failing to be applied to children and/or youths.

SUMMARY OF THE INVENTION

The present invention has been made in view of the foregoing disadvantage of the prior art.

Accordingly, it is an object of the present invention to provide a karaoke system which is capable of creating significant value added.

It is another object of the present invention to provide a karaoke system which can be conveniently used by children and/or youths.

In accordance with the present invention, a karaoke system is provided. The karaoke system generally includes a main unit operatively connectable to a display unit through a wire or by wireless. The main unit feeds the display unit with image data for displaying words of a music piece on the display unit and music data for playing accompaniment music of the music piece, thereby a karaoke performance being carried out according to the words displayed on the display unit and the accompaniment music outputted from the display unit. The karaoke system generally constructed as described above is featured in that the main unit is constructed so as to permit the display unit to display images constituting at least one story in order and so as to output words and accompaniment music of a music piece associated with the story to the display unit during the course of the story.

In a preferred embodiment of the present invention, the story may be constructed so as to progress while being ramified into a plurality of branches. The branches are set so as to permit a user to select the branches as desired and each have a musical piece which is associated therewith set therein.

In a preferred embodiment of the present invention, a selection menu for selecting the story may be displayed in the form of a picture.

In a preferred embodiment of the present invention, the system further includes a memory cartridge detachably mounted in the main unit. The memory cartridge has data for the musical piece and data for the story stored therein. Such construction permits replacement of the cartridge, so that the karaoke system may be accommodated to a variety of requests by users.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a karaoke system according to the present invention will be described with reference to the accompanying drawings.

Figure 1:
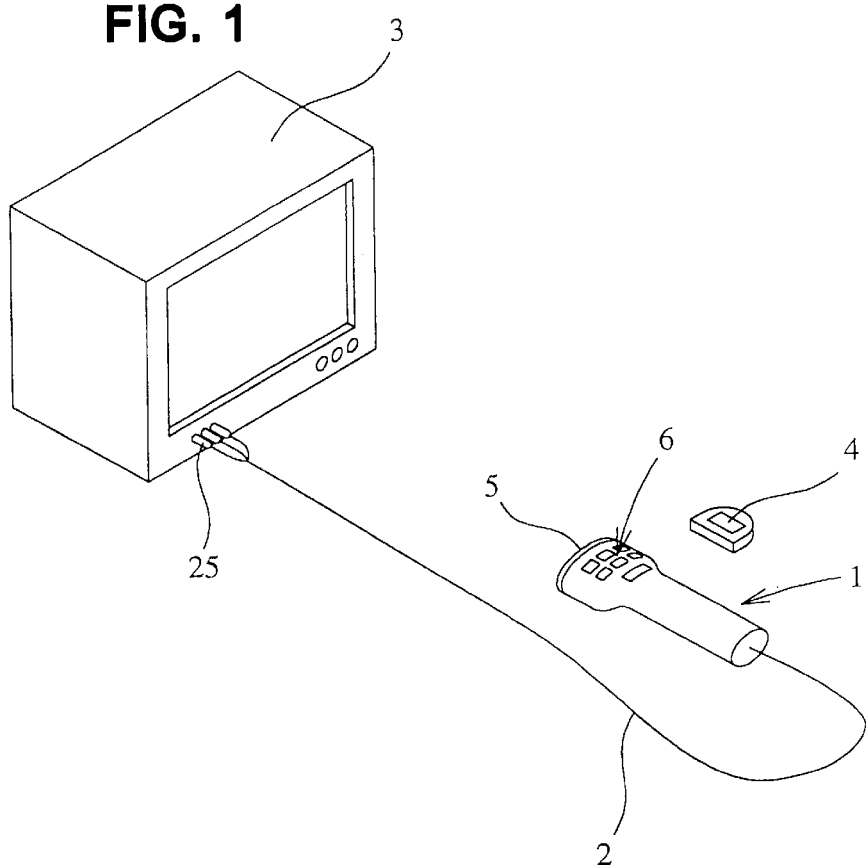
FIG. 1 is a schematic perspective view showing an embodiment of a karaoke system according to the present invention.

Referring first to FIG. 1, an embodiment of a karaoke system according to the present invention is illustrated. A karaoke system of the illustrated embodiment generally includes a main unit 1, a TV acting as a display unit 3 and connected to the main unit 1 through an audio/video cable (hereinafter referred to as "AV cable") 2, and a cartridge 4 detachably mounted in the main unit 1. Alternatively, the main unit 1 may be operatively connected to the display unit by wireless.

The main unit 1 is formed to have a rod-like shape of a thickness sufficient to permit a user to grip it by one hand and includes a head portion which has a microphone 5 integrally incorporated therein, through which a voice of a user or performer is inputted to the main unit 1 of the karaoke system. The main unit 1 is provided on an upper portion of a front surface thereof with an operation section 6 including a variety of operation keys or buttons. Also, the main unit 1 is mounted on a lower end thereof with the AV cable 2 through which the main unit 1 is connected to the TV acting as the display unit 3. Further, the main unit 1 is provided on a rear surface thereof with a connector 7 in which the cartridge 4 is detachably fitted, as shown in FIG. 2B.

Figure 2A:
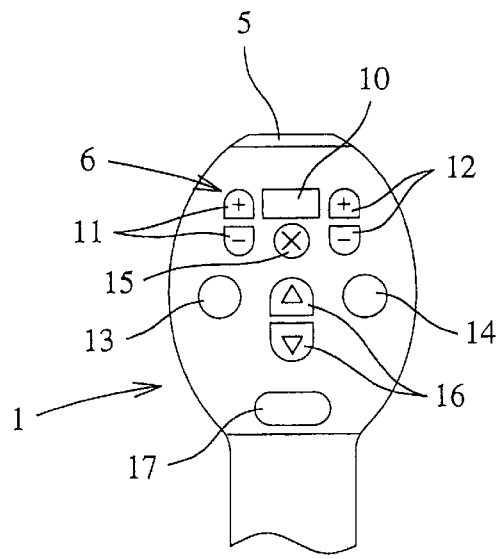
FIG. 2A is a fragmentary front elevation view showing an essential part of a main unit incorporated in the karaoke system shown in FIG. 1.
Figure 2B:
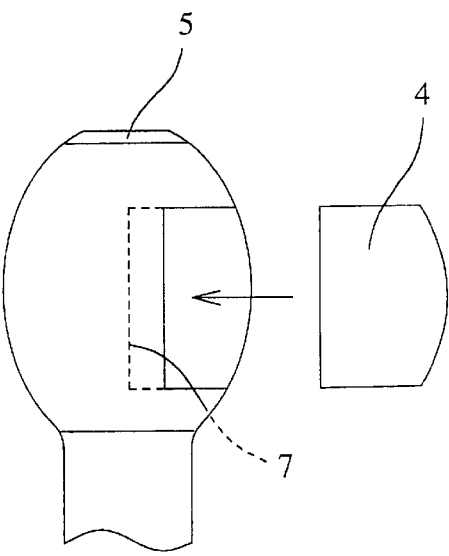
FIG. 2B is a fragmentary rear view of the essential part of the main unit shown in FIG. 2A.

The operation section 6, as shown in FIG. 2A, includes a display 10 including light emitting diodes for two figures or digits each constituted of seven segments, tempo keys or buttons 11 for variably controlling a reproducing speed or tempo of music being performed in accordance with the user's choice, volume keys or buttons 12 for variably controlling a volume of a reproduced sound of the music being performed, an echo key or button 13 for setting echo time (delay time) at a desired length, an effect key or button 14 for varying a frequency of an output voice with respect to a frequency of a voice inputted from the microphone 5 thereto to change the input voice into a male voice, a female voice or the like, a cancel key or button 15 for canceling various kinds of setting, selection keys or buttons 16 used for selection operation, a decision key or button 17 for confirming results selected by the selection keys or buttons 16 to be effective, and the like.

Figure 3:
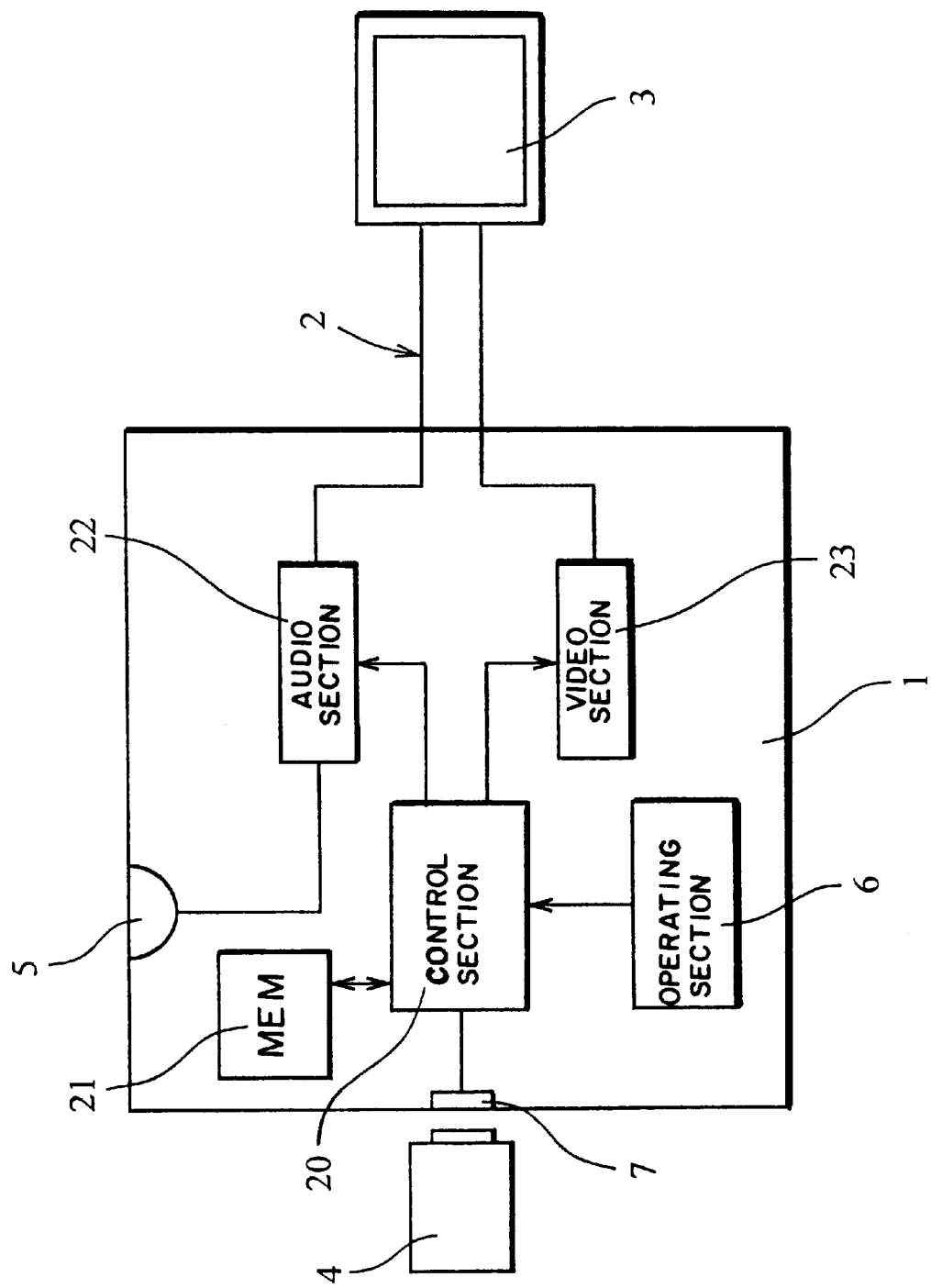
FIG. 3 is a diagrammatic view showing an electrical circuit incorporated in the karaoke system of FIG. 1.

Now, an electrical structure of the karaoke system of the illustrated embodiment will be described with reference to FIG. 3. In FIG. 3, reference numeral 20 designates a control section, which functions to control an audio signal processing section 22 and a video signal processing section 23 according to an operation signal inputted from the operation section 16 and a control program stored in a memory 21. For this purpose, the control section 20 is constructed so as to read data from the cartridge 4 fitted in the connector 7 to output a performance signal of music selected to the audio signal processing section 22 and output an image signal indicating a title of the music and words thereof to the video signal processing section 23.

The audio signal processing section 22 is configured so as to subject a sound signal inputted thereto from the microphone 5 and an accompaniment signal outputted from the control section 20 to both mixing and amplification to prepare an audio signal, which is then outputted through the AV cable 2 to the TV 3. The video signal processing section 23 functions to output, in the form of a video signal, image information for displaying a title of music, words thereof and the like inputted thereto from the cartridge 4 to the TV 3 through the AV cable 2. Also, the video signal processing section 23 functions to output, in the form of a video signal, a variety of guide information for guiding setting of the keys or buttons arranged on the operation section 6, such as, for example, an echo, a level of a key, a speed of performed music, a voice change and the like.

The video signal and audio signal thus outputted are inputted to an AV input terminal 25 of the TV 3 acting as an output unit. The video signal thus inputted is displayed in the form of an image on a monitor of the TV 3. The audio signal is outputted from a loudspeaker of the TV 3.

The cartridge 4 has a read only memory (ROM) incorporated therein, which has data on musical pieces for a karaoke performance and data on stories to be displayed stored therein. The data on each of the musical pieces include performance information for synthesizing the musical piece (MIDI information), information on a title of music thereof and information on words thereof. The data on each of the stories include a program, image data and letter data.

Figure 4:
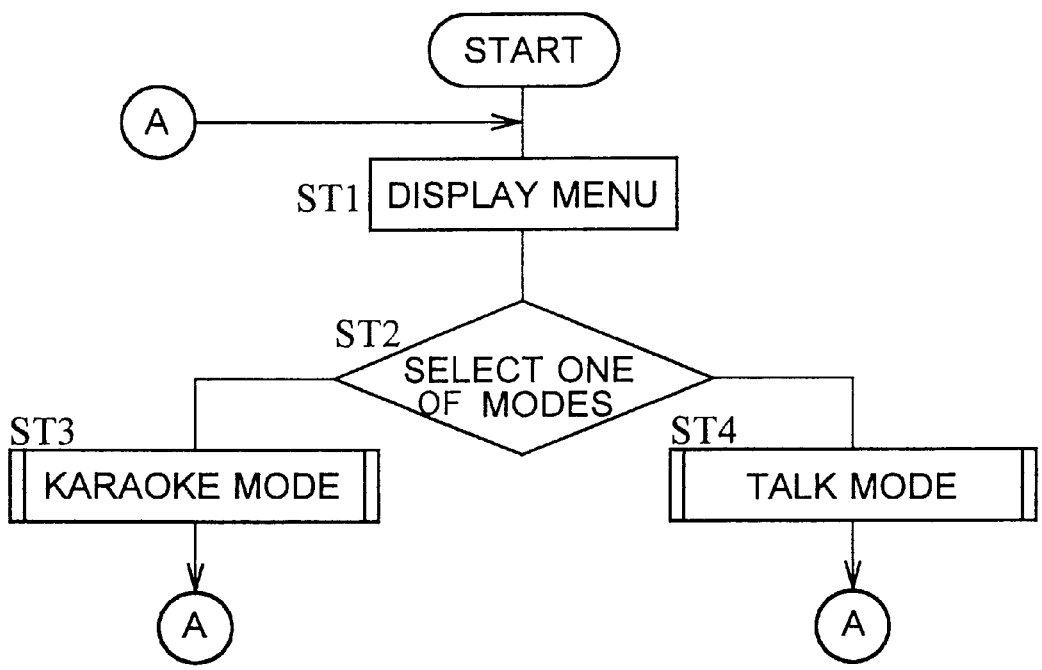
FIG. 4 is a flow chart showing a manner of operation of the karaoke system shown in FIG. 1 by way of example.
Figure 5:
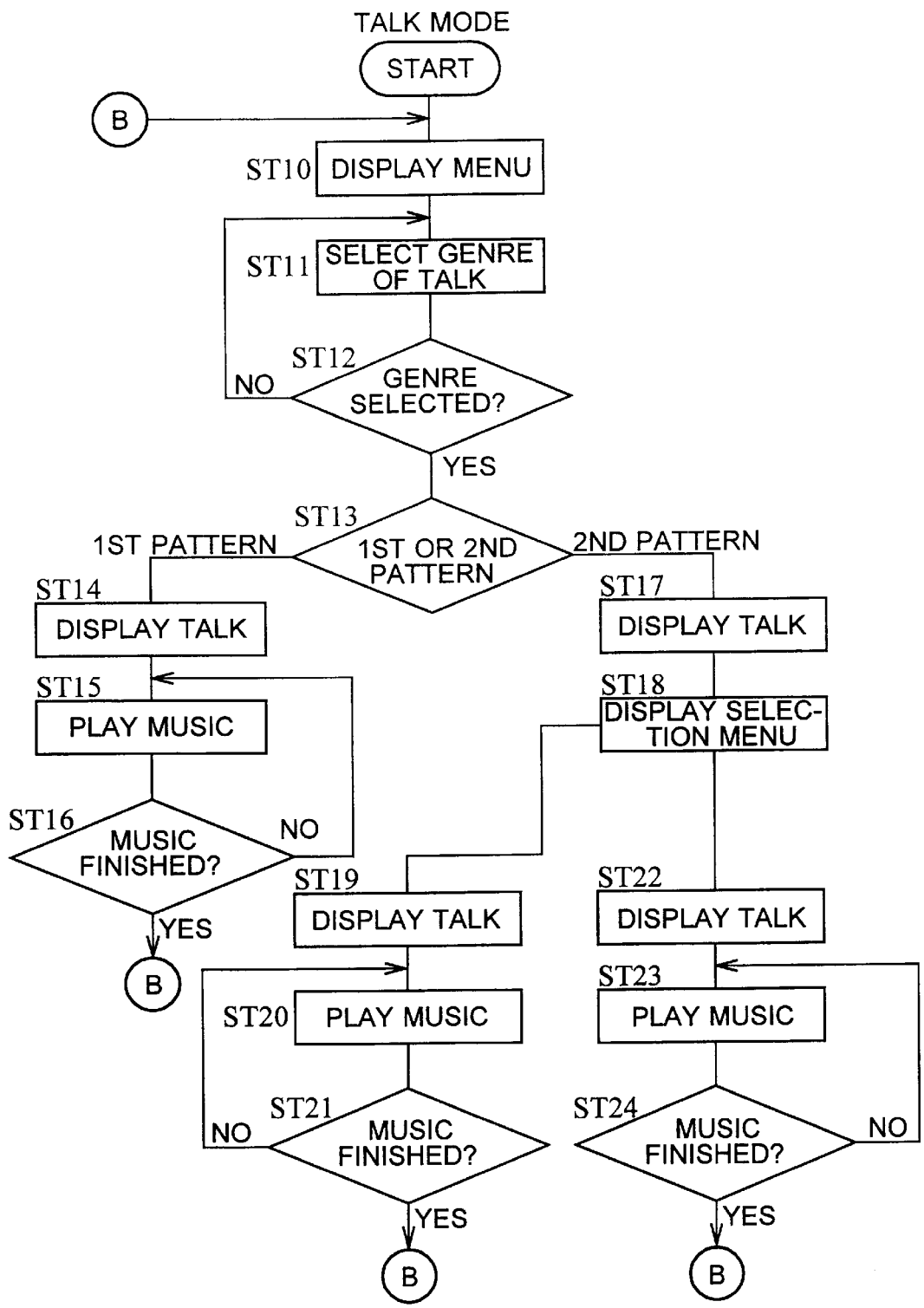
FIG. 5 is a flow chart showing a manner of operation of the karaoke system shown in FIG. 1 in a talk mode.

Now, a manner of operation of the karaoke system of the illustrated embodiment will be described with reference to FIGS. 4 and 5 by way of example.

First, the cartridge 4 is inserted in the connector 7 of the main unit 1 and then a power supply is turned on. This results in a menu image being displayed on the TV 3 (a step ST1). The menu image indicates that any one of a talk mode and a karaoke mode should be selected. Thus, a user may select desired one of the modes by means of the selection keys or buttons 16 and then push the decision key or button 17 (a step ST2).

When the "karaoke mode" is selected, the operation or procedure is transferred to a step ST3, so that karaoke mode processing may be carried out. In the karaoke mode processing, titles of musical pieces stored are displayed, thus, the user may select a musical piece which he or she desires to sing for a karaoke performance. Then, when the user pushes the decision button 17, a melody of the musical piece selected is outputted from the TV 3 and words thereof are displayed thereon. Thus, the user may sing a song of the piece in accordance with the melody. When performance of the musical piece is finished, the operation is turned to the menu image of the step ST1.

When the "talk mode" is selected, the operation or procedure is advanced to a step ST4, to thereby carry out "talk model" processing. In the talk mode processing, a menu image for the talk mode is displayed on the TV 3 (a step ST10). The menu image is displayed in the form of a picture rather than letters. By way of example, as shown in FIG. 6, the menu image may be displayed in the form of a picture which permits a talk associated with houses, fields and mountains located on an island, as well as a boat floating on a sea to be imagined.

Figure 6:
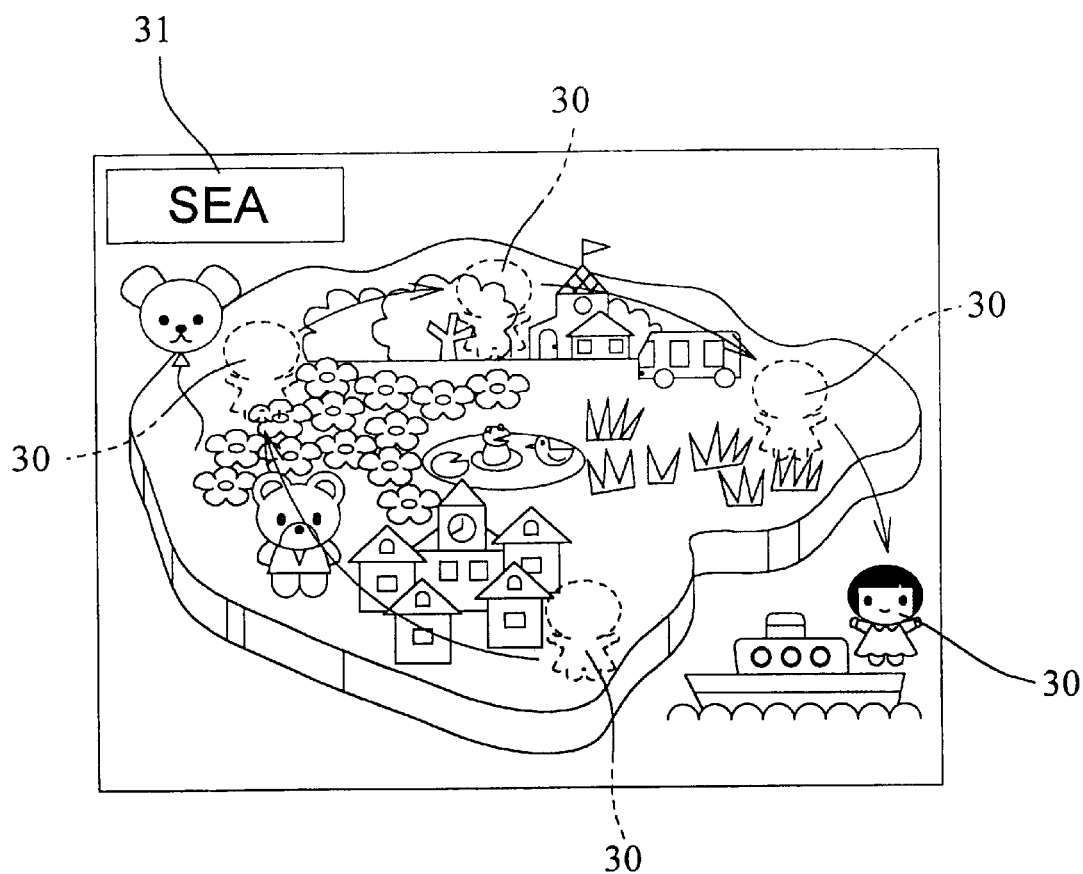
FIG. 6 is a pictorial view showing a menu image displayed during the course of a karaoke performance by way of example.

Every time the selection buttons 16 are pushed, a character 30 is moved as indicated by dotted lines and solid lines, following the arrows shown in FIG. 6, so that a genre of a talk associated with a place where the character 30 is positioned is displayed in the form of letters on a display corner 31 defined on an upper left location of a screen of the TV 3 (a step ST11). A genre of a talk displayed on the TV is associated with a place of the character 30 indicated at solid lines. Thus, in FIG. 6, the genre is associated with a sea. Then, the decision button 17 is pushed when a genre of a talk which the user desires to hear is displayed on the TV 3. When the decision button 17 is thus pushed (a step ST12), any one of two story progress patterns is randomly selected (a step ST13).

When a first one of the two story progress patterns is selected, a talk selected in the step ST11 is displayed in the form of a combination of pictures and letters like a picture book on the TV 3 (a step ST14). Then, a title of a musical piece associated with the talk is displayed thereon, followed by playing of music of the musical piece (a step ST 15). When the playing is finished (a step ST 16), the operation is returned to the step ST 10, so that the menu image may be displayed again.

Figure 7A:
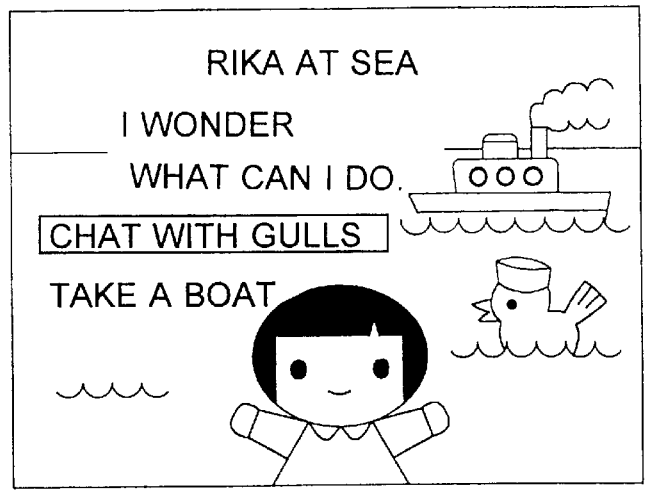
FIGS. 7A, 7B and 7C are pictorial views each showing an image displayed during the course of the karaoke performance by way of example.
Figure 7B:
Figure 7C:
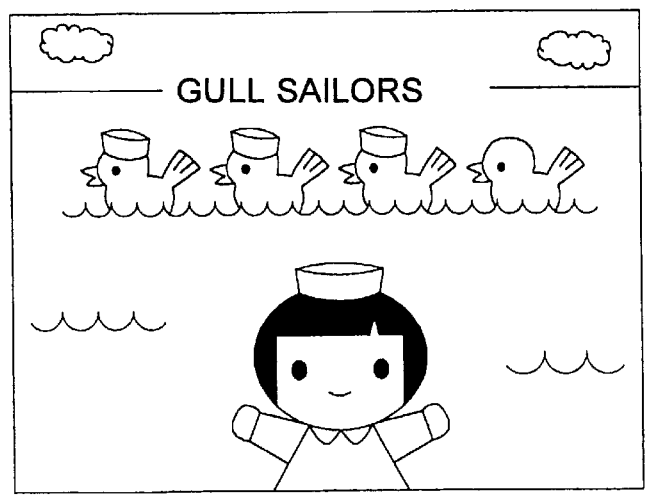

When a second one of the story progress patterns is selected, the "talk" selected in the step ST11 is displayed in the form of a combination of pictures and letters like each of pages or leaves of a picture book on the TV 3 (a step ST17). Subsequently, the operation is advanced to a step ST18, so that an image or selection menu which asks items to be selected for ramifications such as, for example, "take a boat", "chat with gulls" or the like may be displayed on the TV 3. Thus, the user may select a desired one of the items by means of the section buttons 16, followed by operation of the decision button 17, so that an image associated with the selected item may be displayed on the TV 3 as if leaves or pages of a picture book are turned over, as shown in FIG. 7B. This permits the "talk" to be displayed in the form of a combination of pictures and letters on the TV 3 (a step ST19). Then, when a period of time sufficient to permit the user to read through the "talk" elapses, a title of a musical piece associated with the talk is displayed. In the illustrated embodiment, when "chat with gulls" is selected, music of which a title is "Gull Sailors" is displayed on the TV 3 as shown in FIG. 7C.

Then, a melody of the music is outputted from the TV 3 and words thereof are displayed thereon (a step ST20), so that the user may sing a song in conformity to the melody while confirming the words being on the TV as in the conventional karaoke system. When performance of the music is completed (a step ST21), the operation is returned to the menu image of the step ST10.

When another item is selected in the step ST18, the operation is advanced to a step ST22, so that a "talk" relating to the item selected may be displayed on the TV 3, a melody of a musical piece relating thereto may be outputted from the TV 3 and words of the musical piece may be displayed on the TV 3 (a step ST23). Thus, the user may sing a song in conformity to the melody while confirming the words being displayed on the TV 3. When performance of the musical piece is finished (a step ST24), the operation is returned to the menu image of the step ST10.

Thus, the illustrated embodiment permits all information to be displayed by not only letters but pictures associated with a story, so that a user or child may associate the image displayed on the TV with the story. Also, the illustrated embodiment permits the music associated with the story to be performed while progressing the story as if a picture book is read. This permits the karaoke system of the illustrated embodiment to stimulate a user's imagination and provide children or youths with much enjoyment.

As can be seen from the foregoing, the karaoke system of the present invention permits a user to enjoy a karaoke performance according to music associated with a story while ensuring development of the story as if leaves of a picture book are turned over. Also, the above-described construction of the present invention permits the karaoke system to be conveniently used by youths and children excluded from the conventional karaoke system.

Also, the karaoke system of the present invention permits music associated with a story to be played between talks, to thereby create an environment which permits a user to not only sing a song merely but sing a song as he or she is reading a fairy tale with his or her mother, resulting in it effectively contributing to culture of sentiments.

Further, the present invention may be configured so as to permit progress of a story to be ramified into branches and music associated with each of the branches to be set. This prevents the story from being rendered simple or monotonous and leads to a variation in music depending on progress of the story, so that a user may enjoy a karaoke performance without losing interest.

In addition, the menu image or selection menu may be displayed in the form of pictures as well as letters. This results in a user associating the pictures with a story and/or music, so that he or she may enhance his or her creative power and thinking power, as well as his or her singing capability.

Moreover, in the present invention, data on music and stories may be stored in the memory cartridge detachably mounted in the main unit. Such construction results in the number of music pieces and stories stored being substantially infinite, so that the karaoke system of the present invention may be accommodated to a variety of requests by users.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A karaoke system comprising:
    a main unit operatively connectable to a display unit though a wire or by wireless so as to feed said display unit with image data for displaying words of a music piece on said display unit and music data for playing accompaniment music of the music piece, thereby a karaoke performance being carried out according to the words displayed on said display unit and the accompaniment music outputted from said display unit.
    a connector on the main unit;
    a cartridge for removable connection to the main unit through the connector, the cartridge storing data for providing audio signals and video signals to enable a series of images to be displayed on said display unit to provide a story and corresponding sounds and speech to accompany the story;
    an input control unit is provided on the main unit to enable inputs by the user to control the presentation of the story through the series of images;
    said main unit being constructed so as to permit said display unit to display images constituting at least one story in order and to output words and accompaniment music of a music piece associated with the story to said display unit during the course of the story.

2. A karaoke system as defined in claim 1, wherein said story is constructed so as to progress while being ramified into a plurality of branches;
    said branches being set so as to permit a user to select said branches as desired and each having a musical piece which is associated therewith set therein.

3. A karaoke system as defined in claim 2, wherein a selection menu for selecting said story is displayed in the form of a picture.

4. The karaoke system of claim 1 wherein the input control unit enables a selection of a karaoke mode of operation and a story talk mode of operation, wherein in the story talk mode of operation the story progresses in a sequence of a series of images.

5. A karaoke system comprising:
    a main unit; and
    a display unit connected to said main unit through a wire or by wireless;
    said display unit being fed with image data for displaying words of a music piece on said display unit and music data for playing accompaniment music of the music piece from said main unit, thereby a karaoke performance is carried out according to words displayed on said display unit and accompaniment music outputted from said display unit;
    said main unit including an input control unit and a controller unit for processing audio and video data and control signal's input from a user through the input control unit to enable a series of images to be displayed on said display unit to provide a story and corresponding sounds and speech to accompany the story as controlled by the user for presentation of the story through a series of images;
    said main unit being constructed so as to permit said display unit to display images constituting at least one story in order and so as to output words and accompaniment music of a music piece associated with the story to said display unit during the course of the story.

6. A karaoke system as defined in claim 5, further comprising a memory cartridge detachably mounted in said main unit, said memory cartridge having data for said musical piece and data for said story stored therein.

7. A combination handheld karaoke and story microphone system that can be operatively connectable to a television display unit comprising:
    a body member having a lower handle portion for grasping by a user's hand and an upper head control portion;

a microphone mounted on the head control portion for picking up sounds to enable a user to sing and/or speak into the microphone to provide a first audio signal;

input control unit mounted on the head control portion to enable the user to input control signals;

a receptor connector on the body member;

a cartridge unit for storing audio and video data removably connected to the receptor connector, the audio and video data enabling a second audio signal to be broadcast and the video data enabling video signals to generate images to be displayed by the television display unit, the input control signals enable the user to control the broadcast and display of the first and second audio signals and the video signals, the cartridge unit includes data representative of a story that the user can interact with through the input control unit;

a controller unit mounted in the body member for reading and processing audio and video data from the cartridge unit and processing control signals from the user;

an audio signal processing section to process the first and second audio signals;

a video signal processing section to process the video signals from the control unit; and means for transmitting the audio and video signals to the television display wherein a compact and handheld karaoke microphone system can provide a mix of audio signals from the microphone and the cartridge unit and video signals from the cartridge unit drive the television display unit.

8. The handheld karaoke and story microphone system of claim 7 wherein the input control unit includes a control member to enable a user to selectively move a character image generated by the cartridge unit across the television display unit.

9. The handheld karaoke and story microphone system of claim 8 wherein the cartridge unit provides sets of audio and video signals that are enabled for broadcast and display by the television display unit in response to the position of the character image on the television display unit.

10. The handheld karaoke and story microphone system of claim 9 wherein the video signal processing section outputs guide information from the cartridge unit for setting the input control unit by the user from a guide menu displayed on the television display unit.

11. The handheld karaoke and story microphone system of claim 9 wherein the video signal processing section outputs a talk menu to enable the user to select one of a talk mode for providing an audio and visual storing for interaction with the user and a karaoke mode for enabling the user to sing a song with accompanying music and images.

12. The handheld karaoke and story microphone system of claim 11 wherein the talk mode provides random genre of audio signals associated with positions of the character image on the television display screen.

* * * * *